P. T. WEBB.
LOCKING DEVICE FOR THE NUTS OF BOLTS AND THE LIKE.
APPLICATION FILED DEC. 23, 1919.
1,390,944.
Patented Sept. 13, 1921.
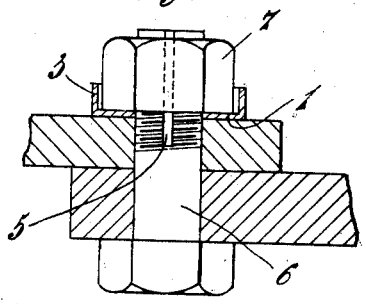
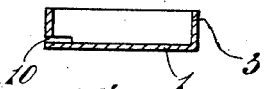
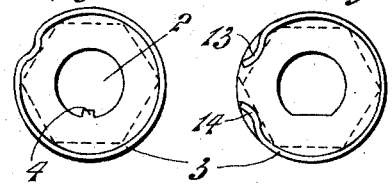
Inventor:
Purcell Thomas Webb
By Lawrence Langner
Attorney.

UNITED STATES PATENT OFFICE.

PURCELL THOMAS WEBB, OF TIMARU, NEW ZEALAND.

LOCKING DEVICE FOR THE NUTS OF BOLTS AND THE LIKE.

1,390,944. Specification of Letters Patent. Patented Sept. 13, 1921.

Application filed December 23, 1919. Serial No. 346,884.

*To all whom it may concern:*

Be it known that I, PURCELL THOMAS WEBB, a subject of the King of Great Britain and Ireland, residing at Timaru, in the Dominion of New Zealand, have invented a new and useful Improvement in Locking Devices for the Nuts of Bolts and the like; and I do hereby declare the following to be a full, clear and exact description of the same.

This invention relates to locking devices for the nuts of bolts and the like.

The object of the invention is to provide a simple locking device which will be effective in preventing the nut from slacking.

According to the present invention a locking washer or cap is provided which fits over the screwed end of the bolt, stud or the like. The washer has a cylindrical wall which is adapted to extend upward and encircle the nut, and which admits of the nut being rotated therein. The threaded portion of the bolt or stud has a slot on one or more side portions while the washer has a tongue upon its inner edge adapted to enter the slot, or a side portion to fit the flattened portion of the bolt. A portion of the cylindrical wall is made to engage one or more of the sides of the nut thus preventing the nut from rotating independently of the washer. A saw-cut is provided in the wall near the washer in order that that portion of the wall above the saw-cut may be tapped so as to lie against the face of the nut, said portion acting as a spring to lock the nut, or the wall above the saw-cut may be severed to form two spring leaves which bear upon the sides of the nut and so form a lock.

The invention will be fully described with the aid of the accompanying drawings, in which:—

Figure 1 is a cross-section showing a nut locked upon a bolt.

Fig. 2 is a cross-section of a washer having a saw-cut therein.

Fig. 3 is a plan of such a washer.

Fig. 4 is a similar view of a washer having the wall cut and bent to form spring leaves.

Referring now to the drawings the washer 1 has a hole 2 and a cylindrical wall 3 rising upward as shown. The washer 1 has a tongue 4 upon its inner edge shown in Fig. 3. This tongue 4 is adapted to fit into a slot 5 in the threaded portion of the bolt 6. The wall 3 rises upward and around the nut 7 and is of such a size to admit of the nut being rotated therein. The washer is inserted over the end of the bolt, the tongue 4 fitting the slot as indicated and the nut is screwed home.

As shown in Figs. 2 and 3, a saw-cut is provided just above the washer and that portion of the wall above the saw-cut is then bent against one of the sides of the nut as indicated in Fig. 3, and in this case is made of spring metal and admits of the nut being turned by a spanner, but prevents any slacking of the nut. In Fig. 4, the wall 3 is cut, and the ends 13 and 14 bent as shown to form leaves adapted to bear upon the sides of the washer. The leaves bear upon the sides of the nut and admit of the nut being rotated by a spanner, but are strong enough to prevent any slacking.

It will be seen that unless a tool is applied the nut cannot be rotated without the washer, and the washer being prevented from rotating by the tongue 4 fitting over the slot, the nut is prevented from slacking.

What I claim is:—

In a device of the kind described, a threaded bolt or stud, a nut threaded upon said bolt, a washer below said bolt, a cylindrical wall rising upward from the outer periphery of said washer and encircling said nut, a saw-cut in said cylindrical wall and the portion of said wall above said saw-cut flattened against a side of said nut to act as a spring to check said nut and means whereby said washer is prevented from rotating on said bolt, substantially as described.

In testimony whereof I have signed my name to this specification in the presence of two subscribing witnesses.

PURCELL THOMAS WEBB.

Witnesses:
M. J. O'BRIEN,
H. REEVE.